(12) United States Patent
McAlea et al.

(10) Patent No.: US 8,137,609 B2
(45) Date of Patent: Mar. 20, 2012

(54) APPARATUS AND METHOD FOR COOLING PART CAKE IN LASER SINTERING

(75) Inventors: Kevin Patrick McAlea, Charlotte, NC (US); Thomas Hsing Pang, Charlotte, NC (US); Praveen Tummala, Rock Hil, SC (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 13/194,311

(22) Filed: Jul. 29, 2011

(65) Prior Publication Data
US 2011/0285061 A1 Nov. 24, 2011

Related U.S. Application Data

(62) Division of application No. 12/338,521, filed on Dec. 18, 2008, now abandoned.

(51) Int. Cl.
*B29C 35/08* (2006.01)
*H05B 6/00* (2006.01)

(52) U.S. Cl. ............ 264/497; 264/113; 264/405
(58) Field of Classification Search .............. 264/113, 264/405, 497
See application file for complete search history.

(56) References Cited

U.S. PATENT DOCUMENTS

| | | |
|---|---|---|
| 2,250,697 A | 7/1941 | Bassett |
| 2,301,148 A | 11/1942 | Schwarz |
| 2,339,458 A | 1/1944 | Champney |
| 3,973,762 A | 8/1976 | Cappel |
| 3,986,138 A | 10/1976 | Neal |
| 4,247,508 A | 1/1981 | Housholder |
| 4,414,028 A | 11/1983 | Inoue |
| 4,697,631 A | 10/1987 | Bungeroth et al. |
| 4,740,352 A | 4/1988 | Takahashi |
| 4,817,858 A | 4/1989 | Verpoort |
| 4,849,154 A | 7/1989 | Masumoto |
| 4,863,538 A | 9/1989 | Deckard |

(Continued)

FOREIGN PATENT DOCUMENTS

DE 3445613 7/1985

(Continued)

OTHER PUBLICATIONS

European Search Report for European Application No. EP 0525744.9.

(Continued)

*Primary Examiner* — Joseph Del Sole
*Assistant Examiner* — Jeremiah Smith
(74) *Attorney, Agent, or Firm* — Keith A. Roberson

(57) ABSTRACT

A part cake defining a build produced by laser sintering and the surrounding unfused powder is contained in an enclosure, and the enclosure includes displaceable wall portions for compressing the part cake to support the build against distortion during rapid cooling from a cooling fluid. The enclosure enables the part cake to be quickly and reliably cooled either within the laser sintering system or outside the laser sintering system. A source of cooling fluid connects to the enclosure and a lid holds the part cake in place as cooling fluid is forced through the pore volume of the cake. An inert gas blanket apparatus is also provided to reduce or prevent oxidation of the part cake and/or to cool the part cake. Once the part cake is cooled, the build produced by laser sintering may be removed from the part cake.

12 Claims, 12 Drawing Sheets

U.S. PATENT DOCUMENTS

| | | | |
|---|---|---|---|
| 4,944,817 | A | 7/1990 | Bourell et al. |
| 5,132,143 | A | 7/1992 | Deckard |
| 5,204,055 | A | 4/1993 | Sachs et al. |
| 5,304,329 | A | 4/1994 | Dickens et al. |
| 5,527,877 | A | 6/1996 | Dickens et al. |
| 5,622,216 | A | 4/1997 | Brown |
| 5,622,577 | A | 4/1997 | O'Connor |
| 5,658,412 | A | 8/1997 | Retallick et al. |
| 5,709,397 | A | 1/1998 | Hall |
| 5,753,274 | A | 5/1998 | Wilkening et al. |
| 5,798,469 | A | 8/1998 | Nufer |
| 5,846,370 | A | 12/1998 | O'Conner |
| 5,937,265 | A | 8/1999 | Pratt et al. |
| 5,993,297 | A | 11/1999 | Hyatt et al. |
| 6,042,774 | A | 3/2000 | Wilkening et al. |
| 6,153,142 | A | 11/2000 | Chan et al. |
| 6,269,540 | B1 | 8/2001 | Islam et al. |
| 6,383,446 | B1 | 5/2002 | Tokito |
| 6,531,086 | B1 | 3/2003 | Larsson |
| 6,554,600 | B1 | 4/2003 | Hofmann et al. |
| 6,656,409 | B1 | 12/2003 | Keicher et al. |
| 6,682,688 | B1 | 1/2004 | Higashi et al. |
| 6,811,744 | B2 | 11/2004 | Keicher et al. |
| 6,932,935 | B1 | 8/2005 | Oberhofer et al. |
| 7,134,813 | B2 | 11/2006 | Kleiner |
| 7,296,599 | B2 | 11/2007 | Cox |
| 7,357,629 | B2 | 4/2008 | Weiskopf |
| 2002/0057627 | A1 | 5/2002 | Schubert et al. |
| 2003/0201255 | A1 | 10/2003 | Manetsberger |
| 2003/0222066 | A1 | 12/2003 | Low et al. |
| 2004/0012124 | A1 | 1/2004 | Li et al. |
| 2004/0067275 | A1 | 4/2004 | Trebbi et al. |
| 2005/0263933 | A1 | 12/2005 | Weich et al. |
| 2005/0263934 | A1 | 12/2005 | Chung et al. |
| 2005/0278933 | A1 | 12/2005 | Macke, Jr. et al. |
| 2006/0051233 | A1 | 3/2006 | Ugai et al. |
| 2006/0118532 | A1 | 6/2006 | Chung et al. |
| 2007/0001342 | A1 | 1/2007 | Oberhofer et al. |
| 2007/0023977 | A1 | 2/2007 | Braun et al. |
| 2007/0057412 | A1 * | 3/2007 | Weiskopf et al. .............. 264/497 |
| 2008/0036117 | A1 | 2/2008 | Hickerson et al. |

FOREIGN PATENT DOCUMENTS

| | | |
|---|---|---|
| DE | 3908996 | 9/1990 |
| EP | 1384565 | 1/2004 |

OTHER PUBLICATIONS

European Search Report for European Application No. EP 06006375.

* cited by examiner

APPARATUS AND METHOD FOR COOLING PART CAKE IN LASER SINTERING

CROSS REFERENCE TO RELATED APPLICATIONS

This application is a divisional application of U.S. patent application Ser. No. 12/338,521, filed Dec. 18, 2008, now abandoned, which is hereby incorporated herein in its entirety by reference.

FIELD OF THE INVENTION

This invention relates to laser sintering for the formation of three-dimensional objects from fusible powders and more particularly relates to the cooling of such objects after the sintering has been completed.

BACKGROUND OF THE INVENTION

Laser sintering is a solid imaging process for building three-dimensional objects, layer-by-layer, from a working medium utilizing sliced data sets representing cross sections of the object to be formed. Typically an object representation is initially provided by a computer aided design ("CAD") system. The laser sintering system dispenses a thin layer of heat-fusible powder, normally a fusible polymer powder, polymer coated metal, metal, or ceramic, over a bed of the powder commonly referred to as the "part cake." The laser sintering system applies thermal energy to melt those portions of the powder corresponding to a cross-section of the article being built in that powder layer. Lasers typically supply the thermal energy through modulation and precise directional control to a targeted area of the powder layer. Conventional selective laser sintering systems use carbon dioxide lasers and position the laser beam by way of galvanometer driven mirrors that deflect the laser beam.

The part cake typically includes a movable build platform upon which the bed of powder is disposed. After a powder layer is fused, the build platform moves downward by an incremental distance. The system then dispenses an additional layer of powder onto the previously fused layer and repeats the process of melting and selective fusing of the powder in the next layer, with fused portions of later layers fusing to fused portions of previous layers as appropriate for the article, until the article is complete. These articles are sometimes referred to as "objects," "parts," or "builds;" and the "part cake" includes not only the build(s) but the unfused powder surrounding the build(s). Each additional layer of powder typically is dispensed from a powder feed system that dispenses a measured amount of powder on the part cake. A powder spreader, such as a blade or roller, then spreads the powder over the part cake bed in a uniform manner. In many older systems, once the build is made, it remains within the process chamber under an inert atmosphere until cooled. A newly formed build may require several hours or days to cool and, as a result, the laser sintering system may be inactive during the cooling time, which may cause the system to be unavailable for subsequent builds.

Later laser sintering devices have been developed that include a removable build chamber in which the build platform and build are contained. The build chamber including the new build may be separated from the process chamber so that the part can be cooled outside the process chamber. Meanwhile, a fresh build chamber can be inserted and a new build can be prepared without waiting for the previous build to cool.

Various attempts have been made for more rapid cooling of the part cake outside the laser sintering system to increase the efficiency and speed with which builds can be produced. However, rapid cooling can distort the build(s) within the part cake, so the speed of cooling the part cake must be carefully controlled. It would be desirable to develop an alternative way to rapidly cool part cakes so that the laser sintering system continues to be used to produce new builds during cooling of prior builds and while minimizing distortion of the build and maximizing recovery of unused laser sintering powder for reuse.

In addition, the part cake (including the build) can be discolored if the part cake is removed from the laser sintering system while the part cake is above a certain temperature, for example 150° C., as the result of oxidation of the build and powder. The discoloration can permeate many layers deep into the part cake relative to the outermost layer exposed to ambient conditions; therefore, conventional laser sintering systems typically require that the part cake remain in the laser sintering system a certain amount of time simply to prevent discoloration of the build.

SUMMARY OF THE INVENTION

The invention provides methods and apparatus for cooling a part cake containing a build produced by laser sintering in which the part cake is compressed about the build to allow the un-fused powder to support the build against distortion during the cooling phase. Forced cooling fluid, such as nitrogen, another inert gas, or air, is forced through the pore volume of the compressed part cake powder to rapidly cool the part cake substantially in the absence of distortion of the build dimensions.

In one embodiment, the invention is an apparatus for cooling a part cake that comprises an enclosure for containing the part cake in which the enclosure has opposed displaceable wall portions that can be displaced from a laser sintering position to a part cake compression position and provides for forced cooling fluid to pass through the compressed part cake. In another embodiment, the invention is a method for cooling a part cake in which an enclosure is provided for the part cake that has displaceable wall portions that can be moved from a laser sintering position to a compression position. The displaceable wall portions are moved to a compression position to compress the part cake, and cooling fluid is forced through the part cake to cool the part cake. In more specific embodiments, the part cake is compressed to from less than about 50% of full density to about 70% of full density, full density being defined as that density achieved by fusing the fusible powder. At this higher bed density the part build inside the part cake is held rigidly in place during the cooling phase and suffers little distortion due to the rapid cooling.

In yet more specific embodiments, the enclosure for the part cake has four sides, each of which is compressible by a displacement rod, and the four sides are designed in a nesting relationship that will allow them to be pushed inwardly from a laser sintering position to a part cake compression position. The bottom of the enclosure is formed by the build platform for the part cake, the build platform being movable within the enclosure and lowered within the enclosure as the build is prepared by laser sintering. The build platform has passages formed for the passage of forced cooling fluid through the build platform and into the part cake during the cooling phase. The enclosure fits into a cooling housing that contains the displacement rods, and also includes a lid that functions as the lid for the enclosure and part cake as well as the cooling housing once the part cake has been removed from the laser sintering system. The part cake is held in place against the application of forced cooling fluid by the housing lid that is placed on the part cake after the enclosure has been removed from the laser sintering system. This lid has passages for cooling fluid to escape. The bottom of the housing provides a fitting for a source of cooling fluid. The cooling fluid can be nitrogen or another inert gas, or the cooling fluid can be air.

For older machines that do not have removable and replaceable enclosures for the part cake, then the enclosure can be redesigned for removal from the laser sintering system, and placed in the housing in a cooling station. For newer machines that have removable and replaceable enclosures for the part cake and build, the housing containing the enclosure nests in a wheeled cart that can be removed from the laser sintering system and placed in a cooling station for connection to a source of cooling fluid and for compression of the part cake, while a fresh cart with housing, enclosure and part cake is installed in the laser sintering system. In both cases, semi-continuous operation of the system is possible.

Further embodiments of the present invention comprise an inert gas blanket apparatus that is selectively used to cover the part cake and expose the part cake to an inert gas flow to prevent oxidation of the part cake while the part cake is removed from the laser sintering system. In the exemplary embodiments of the present invention the inert gas comprises nitrogen, while further embodiments comprise alternative inert gases (inert gas as defined herein is any gas that does not react chemically with the powder or fused powder of the part cake). The inert gas blanket apparatus of certain embodiments includes an inert gas supply, a controller with valve devices to selectively control the release of inert gas from the supply, and a lid with a passage to receive the inert gas from the supply and to allow the inert gas to generally expose the part cake to the inert gas to prevent oxidation of the part cake while the inert gas is supplied. Some embodiments of the present invention include a gas sensor capable of monitoring the concentration of inert gas and/or oxygen in the air proximate the part cake for purposes of personnel protection.

Thus, the invention provides, among other benefits, apparatus and methods for compressing a part cake to support a build against distortion and for speedier cooling with forced cooling fluid. The apparatus can be used with older laser sintering systems adapted for removal of the build and part cake enclosure or with more updated systems having a build and part cake enclosure adapted to be removable for cooling in a separate station.

BRIEF DESCRIPTION OF THE DRAWINGS

The foregoing and other aspects and advantages of the invention and the manner in which the same are accomplished will become clearer based on the following detailed description taken in conjunction with the accompanying drawings.

DETAILED DESCRIPTION OF THE INVENTION

The invention will now be described in more detail with reference to the accompanying drawings, in which multiple embodiments are shown. This invention may, however, be embodied in different forms and should not be construed as limited to the embodiments set forth herein. Rather, these embodiments are provided so that this disclosure will be thorough and complete and will fully convey the scope of the invention to those skilled in the art.

Figure 1:
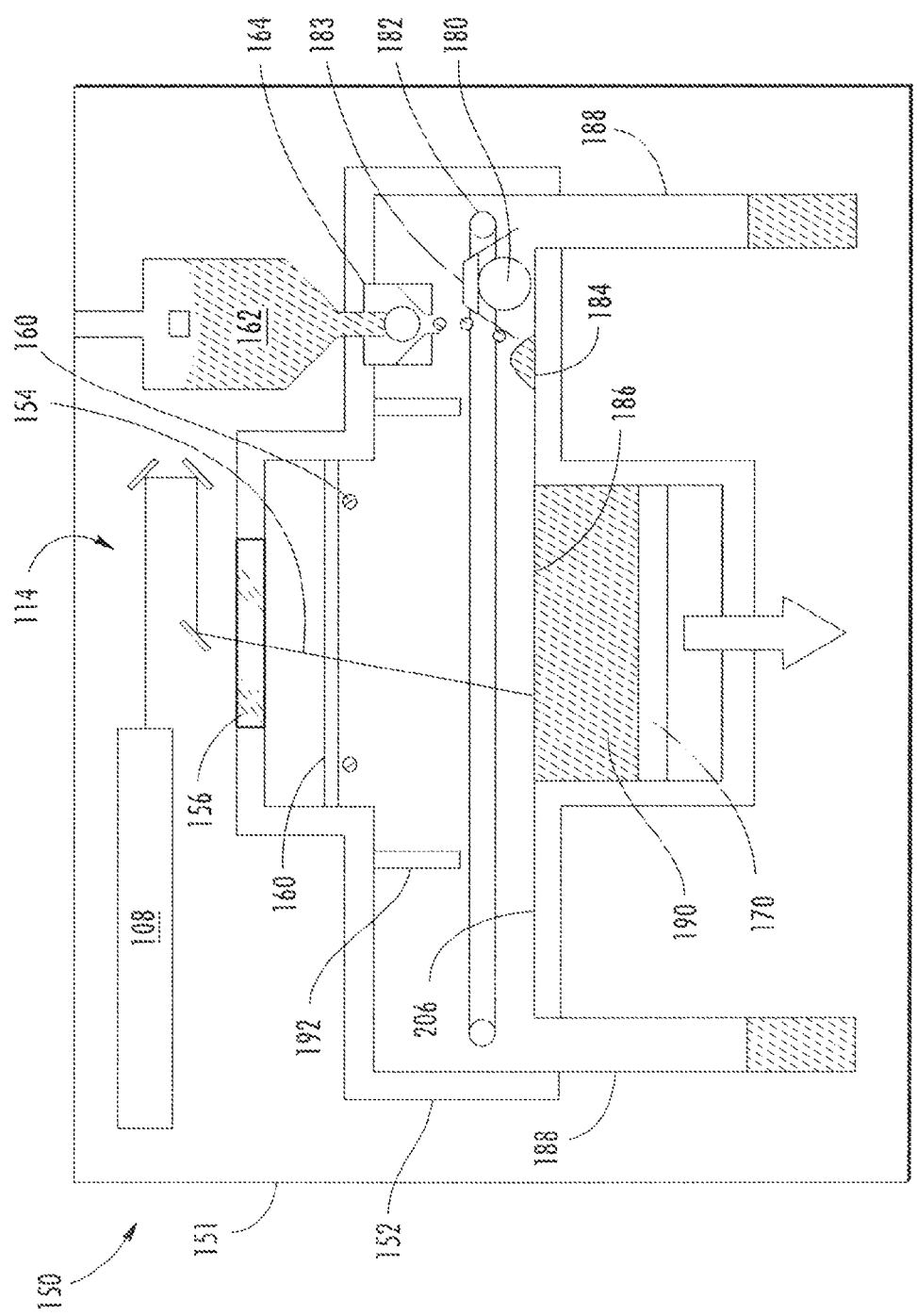
FIG. 1 is a schematic view of a conventional laser sintering system in connection with which the invention described herein may be applied.

FIG. 1, shown generally as the numeral 150, illustrates a conventional laser sintering system. An outer skin 151 of an industrial design surrounds the working system. An optics scanning system 114 directs a laser beam 154 from laser 108. Laser beam 154 enters through a laser window 156 that isolates laser 108 and optics 114 from the higher temperature environment inside a process chamber 152. Radiant heating elements 160 provide heat to target area 186 and to the areas immediately next to the target area. These radiant heaters 160 can be any number of types including for example quartz rods or flat panels. A single powder feed hopper 162 is shown with a bottom feed mechanism 164 controlled by a motor (not shown) to control the amount of powder dropped onto the bed below. The feed mechanism 164 can be of several types, including for example a star feeder, or a rotary drum feeder. Powder feed hopper 162 is shown on the right hand side of the system but could be on the left hand side. A motor (not shown) controls part piston 170 to move downwardly below floor 206 of chamber 152 by a small amount, for example 0.125 mm, to define the thickness of each layer of powder to be processed. Roller 180 is a counter-rotating roller driven by motor 182 that spreads powder from powder wave 184 across laser target area 186. When traveling in either direction the roller carries any residual powder not deposited on the target area into overflow cartridges 188 on either end of the chamber. Target area 186, for purposes of the description herein, refers to the top surface of heat-fusible powder (including portions previously sintered, if present) disposed above part piston 170; the sintered and unsintered powder disposed on part piston 170 will be referred to herein as part bed 190. Although a counter-rotating roller 180 is shown the powder can also be spread by other means such as a wiper or a doctor blade.

The selective laser sintering system shown in FIG. 1 can be used as follows to build parts. In a first powder dispensing step powder is metered from hopper 162 to a position in front of roller 180 to form powder wave 184. In a second step counter-rotating roller 180 is activated to move powder wave 184 slightly forward and park it at the edge of target area 186 in view of radiant heater elements 160 for pre-heating purposes. In a third step, roller 180 is moved back and parked directly under feed hopper 162. Laser 108 is then turned on and scans the current layer to selectively fuse the powder on that layer while scanning roller 180 remains parked directly under powder feeder mechanism 164. While the laser is scanning, the parked powder wave 184 is pre-heated by the action of radiant heater elements 160. In a next step, a second powder wave (not shown) is fed onto the top surface 183 of the roller mechanism. After scanning of the current layer, the roller 180 is activated and traverses completely across target area 186, spreading the first layer of pre-heated powder 184 across target area 186, while carrying the second layer of powder on the top surface 183 of the roller mechanism. Mounted stationary blade 192 dislodges the second layer of powder off the top surface 183 of the roller mechanism as the roller passes under the blade, depositing the second powder wave on the chamber floor while the roller proceeds to feed any excess powder into left overflow 188. In the next step, roller 180 immediately reverses and moves to park the second powder wave near the left side of target area 186 and in sight of radiant heater elements 160 for pre-heating. In a next step, the roller 180 moves back to the left and parks while the laser action is completed and the second quantity of powder is being pre-heated by radiant heaters 160. After the laser action is complete, the roller 180 is then activated and moves to the right to spread the second quantity of powder over target area 186. After leveling the powder, the roller 180 proceeds to the end of its run and drops any excess powder into right overflow 188. This completes the cycle. Repeated cycles result in the building of a completed part in part bed 190 to define a part cake. The collected overflow powder in overflows 188 can in some implementations be part of a powder recycling system that returns powder to feed hopper 162, or the overflows 188 can be used as simple collectors for later manual recycle of powder.

Figure 2:
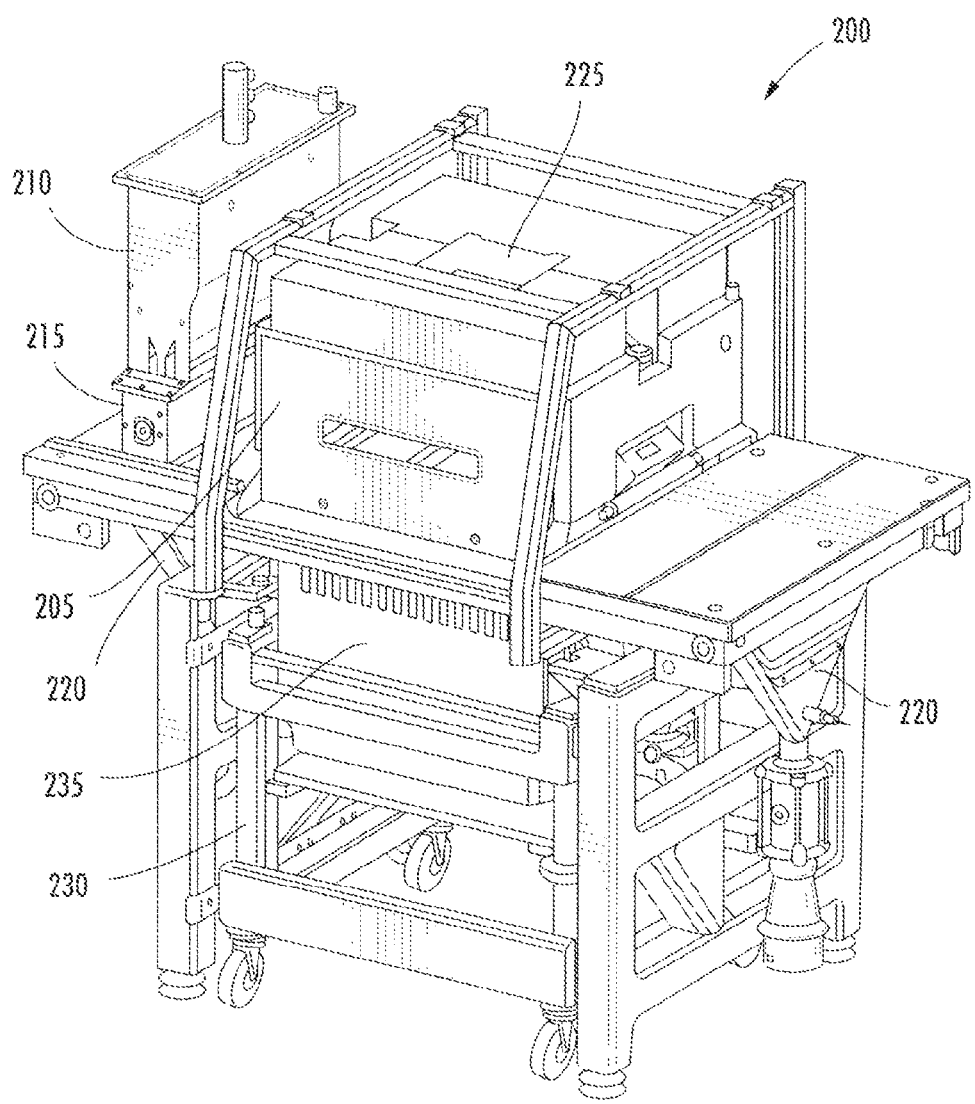
FIG. 2 is a perspective view of a laser sintering system with exterior skin removed for clarity and showing both the part building system and a removable part cake enclosure.

The operation of a laser sintering process as described above in FIG. 1 can be physically implemented in a variety of ways. FIG. 2, shown generally by the numeral 200, shows several key elements of a commercial selective laser sintering with the exterior skin removed for clarity. A central process chamber 205 contains the radiant heating elements described in FIG. 1 and is where the build process, including the spreading and heating of powder, as well as the laser sintering of part builds is conducted. A powder feed hopper 210 is located on the left hand side of process chamber 205. Feed hopper 210 feeds powder to feed mechanism 215 (corresponding to mechanism 164 of FIG. 1). Overflow collectors 220 on either side of the system correspond to overflows 188 of FIG. 1. Left out (for clarity) in FIG. 2 are the laser and optics systems that sit above process chamber 205 and direct the laser beam down through the laser window 225 on top of process chamber 205.

Directly under process chamber 205 is a rapid change module 230 on wheels for easy removal. Rapid change module 230 contains build chamber 235 (similar to part bed 190 of FIG. 1), which at the completion of a build contains all of the parts (sintered powder) and unsintered powder after a build, all of which defines the part cake in certain embodiments of the present invention. Rapid change module 230 includes alignment mechanisms for ensuring that the build chamber 235, and the part cake within, is aligned within the laser sintering system. When a build has been completed, the wheeled cart can be removed from the laser sintering system and another wheeled cart with a build chamber can be inserted into the system. Thus, the system of FIG. 2 has the advantage that the build chamber is easily removed and replaced with a different build chamber, increasing the efficiency of the build process.

Figure 3:
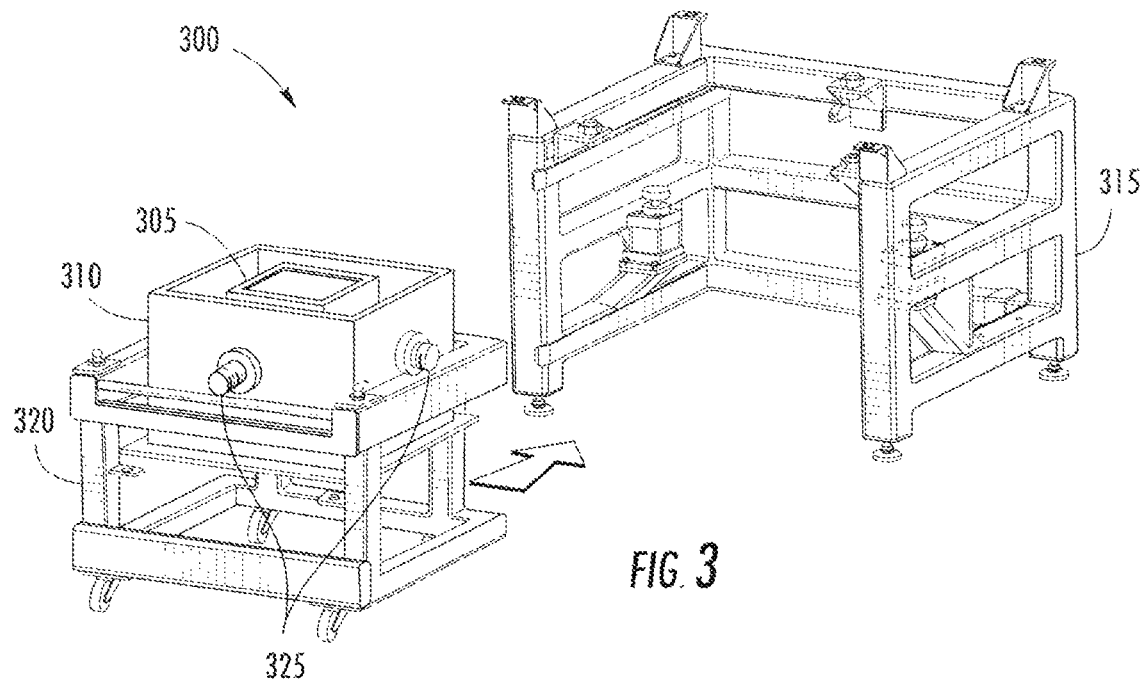
FIG. 3 illustrates in a perspective view an embodiment of portions of the apparatus of the invention in exploded relation, including a wheeled cart for inserting a laser sintering part cake into a laser sintering system.
Figure 4:
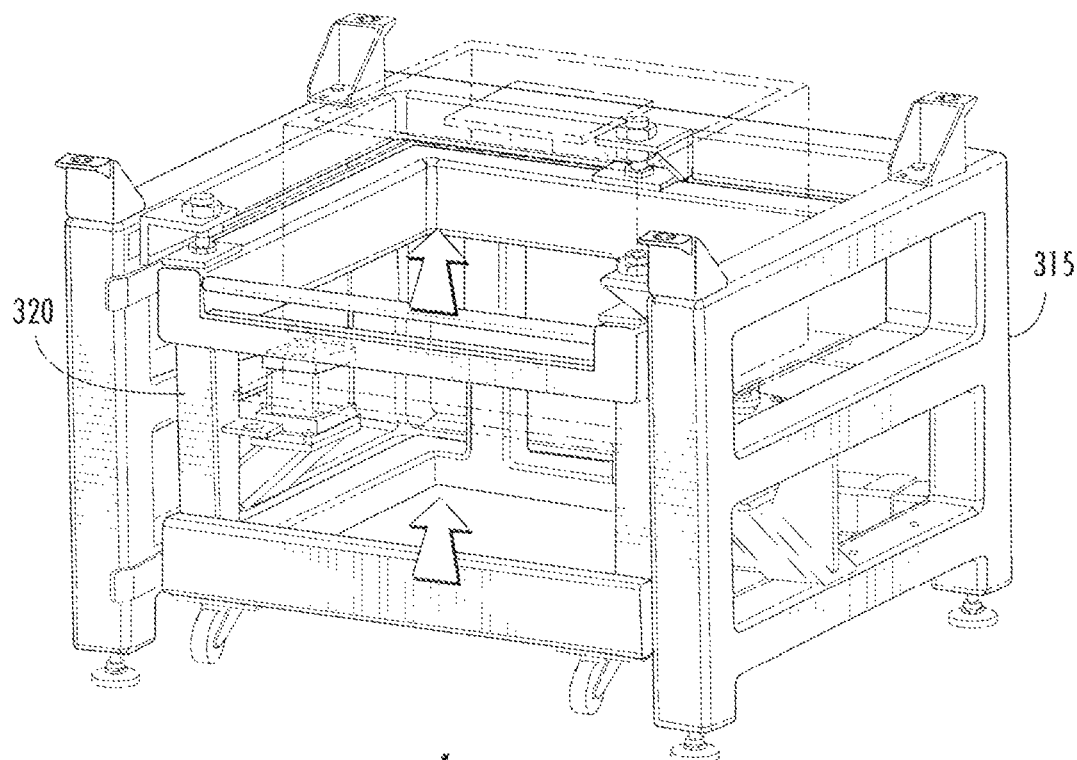
FIG. 4 illustrates in a perspective view the components of FIG. 3 in assembled relation for laser sintering.

FIG. 3, shown generally by the numeral 300 illustrates a modification of the laser sintering system of FIG. 2 in accordance with the present invention. The build chamber 305 is contained within a separate housing 310 that is located on the wheeled cart 320. The wheeled cart 320 is inserted and aligned within a laser-sintering frame 315 of the laser sintering system. As shown in FIG. 4 in shadow, the build chamber 305 has been raised into the laser sintering system to a position for laser sintering. The external housing 310 for the build chamber includes displacement rods 325 provided on each side of the build chamber for moving the pairs of opposed displaceable wall portions of build chamber 305 to compress the part cake within the build chamber. This compression step is performed after a laser sintering build has been removed from the laser sintering system of FIG. 2. Compression of the part cake in build chamber 305 supports the build during forced cooling by inert gas or air so that the build is not distorted by fast cooling or cooling more quickly in some areas than others. This compression is an aspect of the present invention.

Figure 5:
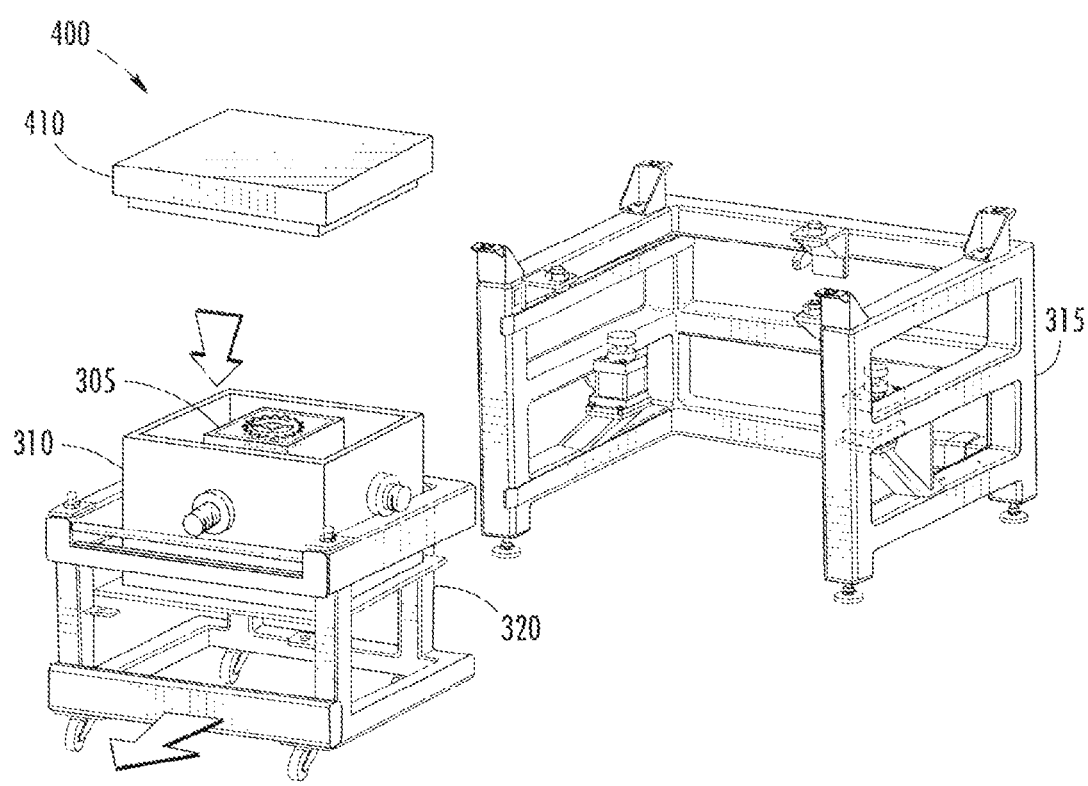
FIG. 5 illustrates in an exploded perspective additional components of the apparatus of FIG. 3, including a lid for the part cake enclosure and enclosure housing.
Figure 6:
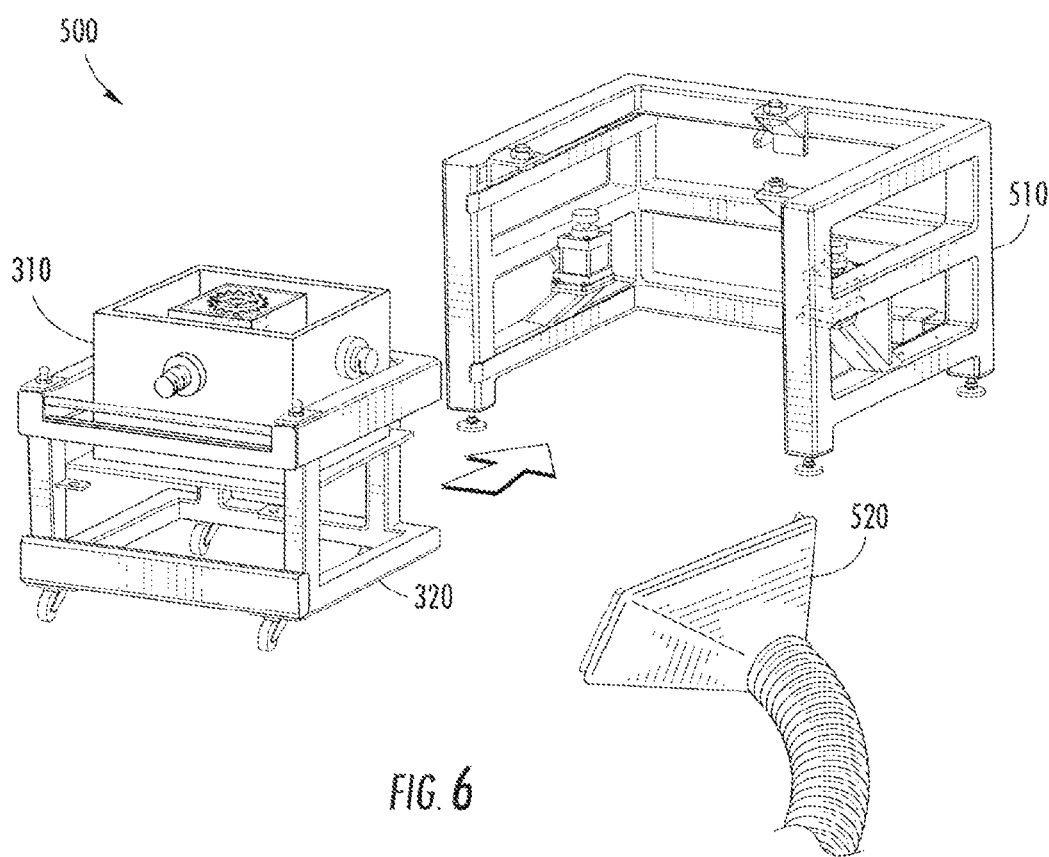
FIG. 6 illustrates in an exploded perspective the wheeled cart of FIG. 3 inserting into a cooling station and a Source of cooling fluid for cooling the part cake in accordance with the invention.
Figure 7:
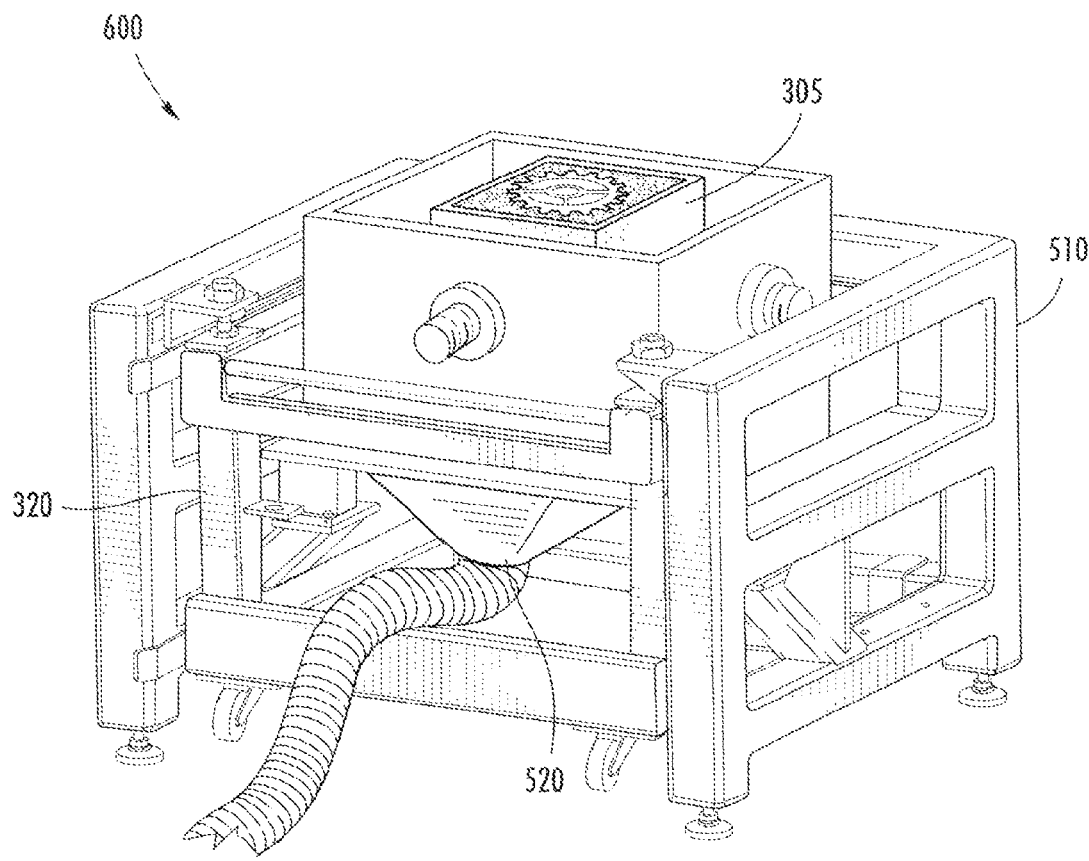
FIG. 7 illustrates the assembly of the components of FIG. 6 in preparation for the cooling phase.

FIG. 5, represented generally by the numeral 400 shows wheeled cart 320, part cake enclosure 305, and housing 310 removed from the laser sintering frame 315 and a lid 410 being placed on the housing for sealing the top of the part cake housing and chamber. Lid 410 keeps the part cake (especially the unfused powder of the part cake) from being blown out of the chamber when forced cooling fluid is applied to the part cake to cool the build. The underside of lid 410 is perforated so that cooling fluid can pass upwardly through the part cake for forced cooling of the build. FIG. 6, represented generally by the numeral 500 illustrates wheeled cart 320, removed from the laser sintering system, to be inserted into a cooling station frame 510 of similar design to the laser-sintering frame 315 of FIG. 5. Also shown is a source of forced cooling fluid 520 for attachment to the part cake chamber and housing in order that the cooling fluid supplied will be in fluid communication with the part cake. FIG. 7, shown generally by the numeral 600 illustrates the combination of the wheeled cart 320 within the cooling station frame 510 and attachment of the source of forced cooling fluid 520 to the underside of the housing directly to the underside of the part cake chamber 305. The build platform is perforated so that cooling fluid from the source of forced cooling fluid rises upwardly through the build platform and part cake to exit through the perforated lid (not shown).

Figure 8:
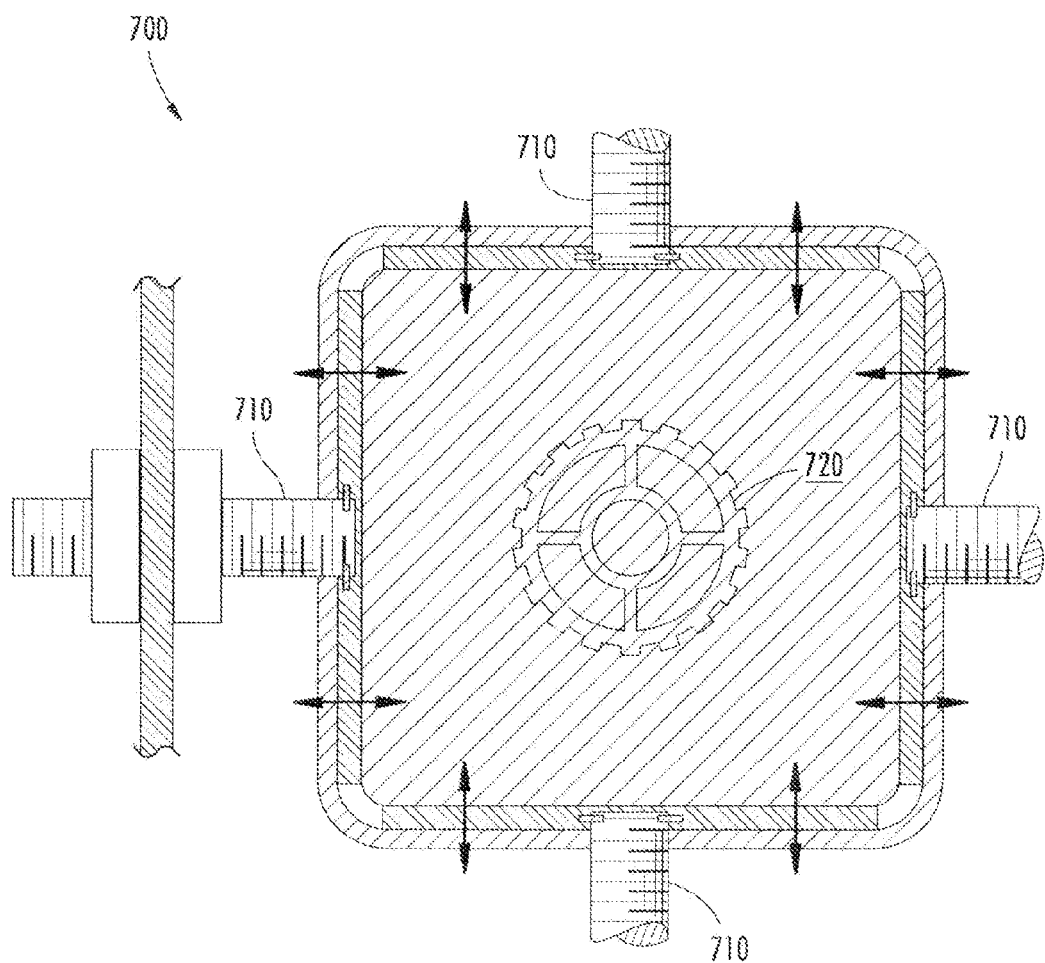
FIG. 8 is a top sectional partial plan view of the part cake enclosure and housing of the invention immediately before part cake compression.

FIG. 8, shown generally by the numeral 700, illustrates an aspect of the present invention. The displaceable wall portions of part cake chamber 305 are offset at the corners so that the displacement rods 710 can compress the displaceable wall portions against the part cake to compress the part cake and support the build. The pairs of opposed displaceable wall portions are moved inwardly in the direction of the arrows to compress the part cake from a laser sintering position to a part cake compression position and moved outwardly in the direction of the arrows to release the part cake from the part cake compression position. Under compression, the part or build 720 is held rigidly while the cooling fluid (inert gas or air) flows through the part cake to maintain the dimensional integrity of the part build as the temperature drops. It should be appreciated that the pairs of opposed displaceable wall portions are in displaceable relation whether only one or both wall portions are moveable, as it is necessary for only one wall portion to move relative to the other wall portion of the pair of opposed displaceable wall portions to define the displaceable relation.

Figure 9:
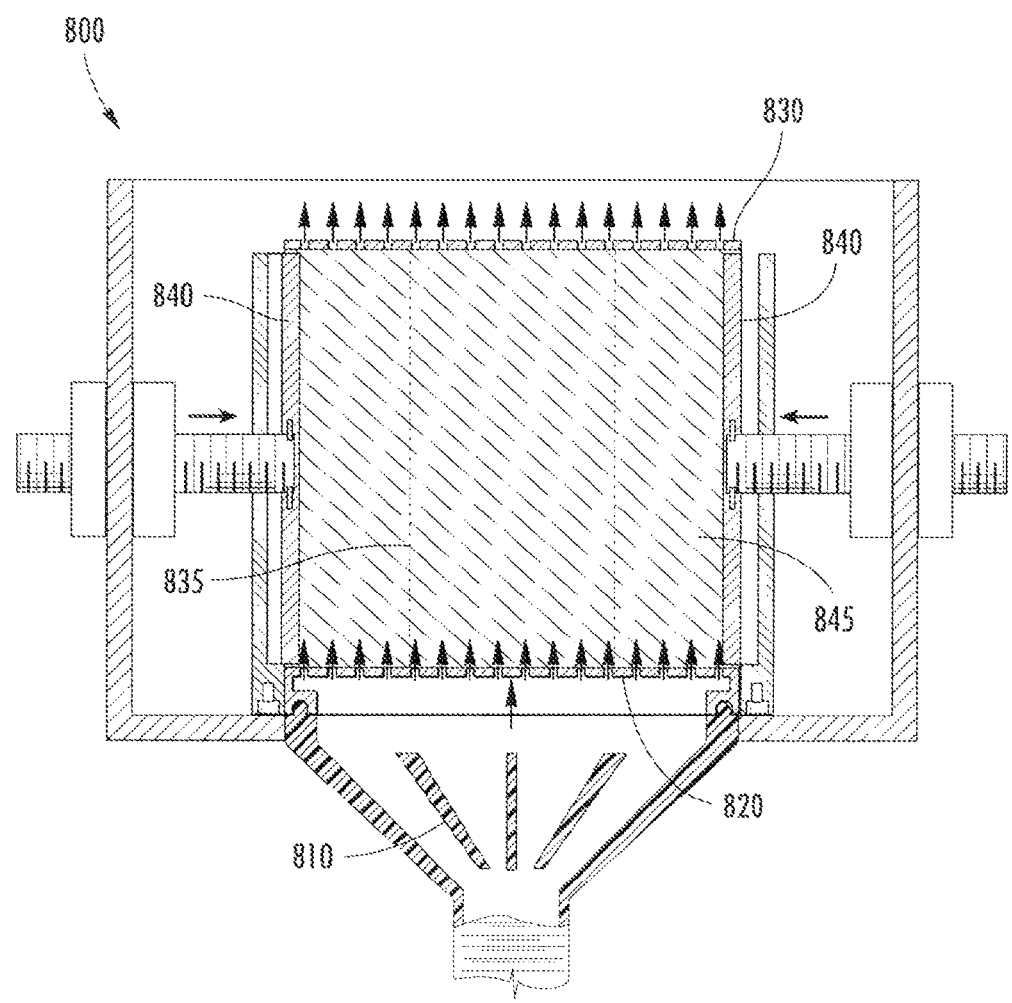
FIG. 9 is a side sectional plan view of the part cake enclosure and housing of the invention showing perforated top and bottom plates, compression of the part cake, and cooling fluid flow through the part cake.

FIG. 9, shown generally by the numeral 800 illustrates forced cooling fluid 810 applied through fluid passages of the perforated build platform 820 and exiting through the perforated lid 830 for the part cake chamber as the pair of opposed displaceable wall portions 840 of the part cake chamber have been moved inwardly to compress the part cake 845. In further embodiments of the present invention, one or more wall portion of the pairs of opposed wall portions include the fluid passages for supplying the cooling fluid through the part cake. For purposes of the present application, the build platform 820 and the perforated lid 830 are considered wall portions. The pair or pairs of opposed displaceable wall portions 840 are considered opposed wall portions. The build 835 is shown in dotted outline within the part cake and corresponds to part build 720 of FIG. 8. When displaceable wall portions 840 are moved inwardly to compress the part cake 845 this is referred to as the part cake compression position. Before part cake 845 is compressed, displaceable wall portions 840 are in a part cake laser sintering position. The density of an uncompressed powder bed is usually close to pour densities (loose powder without any compressive forces exerted), which are about 40% dense. The mechanical compression of this invention can increase that density up to the 60-80% range. 100% density is defined as the density achieved by fusing the fusible powder. In this 60-80% range of compression the part builds 835 are rigidly supported and suffer little distortion due to high cooling rates.

Figure 10:
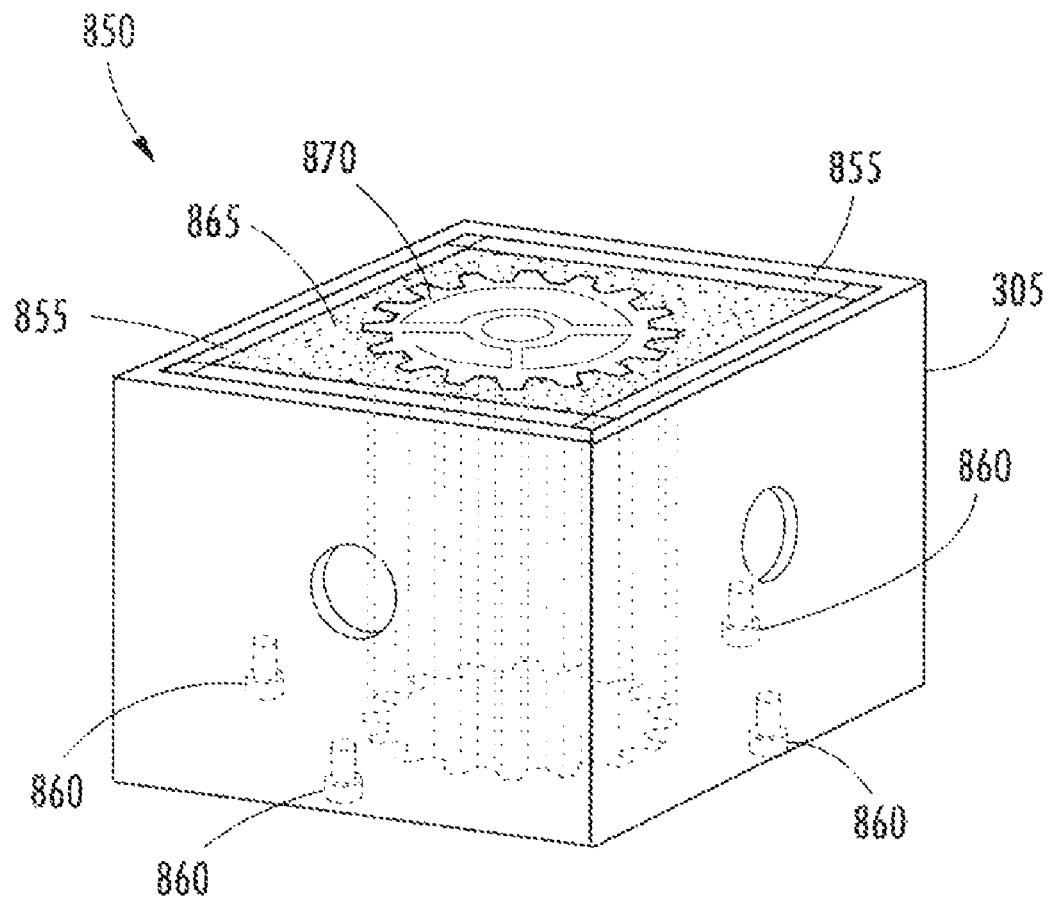
FIG. 10 is a perspective view of the part cake enclosure of the invention.

FIG. 10, shown generally by the numeral 850, illustrates the part cake enclosure 305, which is a double walled enclosure having fixed external walls and having internal displaceable wall portions that are offset at the corners in a nesting relationship so that they can be moved inwardly to compress the part cake 865, surrounding a part build 870, to a part cake compression position. The corners of certain embodiments of the present invention include a generally elastic material to permit movement of one or more wall portions without allowing unfused powder of the part cake to escape the enclosure when the wall portion(s) is/are moved. The part cake enclosure 305 is precisely located within the wheeled cart via bolts 860 (shown in shadow).

The present invention also includes methods for cooling a part cake containing a build produced by laser sintering. The part build is first produced in a laser sintering system, resulting in a completed build that is still at an elevated temperature. The part cake, which includes the build and the surrounding unfused powder, is then removed from the laser sintering system. The removed part cake in an enclosure is then covered with a porous lid and the part cake is compressed by action of the displacement rods against the opposed displaceable wall portions. A source of cooling fluid is then attached to the porous bottom of the part build enclosure and forced cooling fluid is passed through the compressed part cake, cooling the part cake, with the compression precluding the part build from distortion during the rapid cooling. After cooling, the build can be removed from the part cake and the unfused powder can be removed from the enclosure (or the part cake can be removed from the enclosure) by techniques known in the art.

Figure 11:
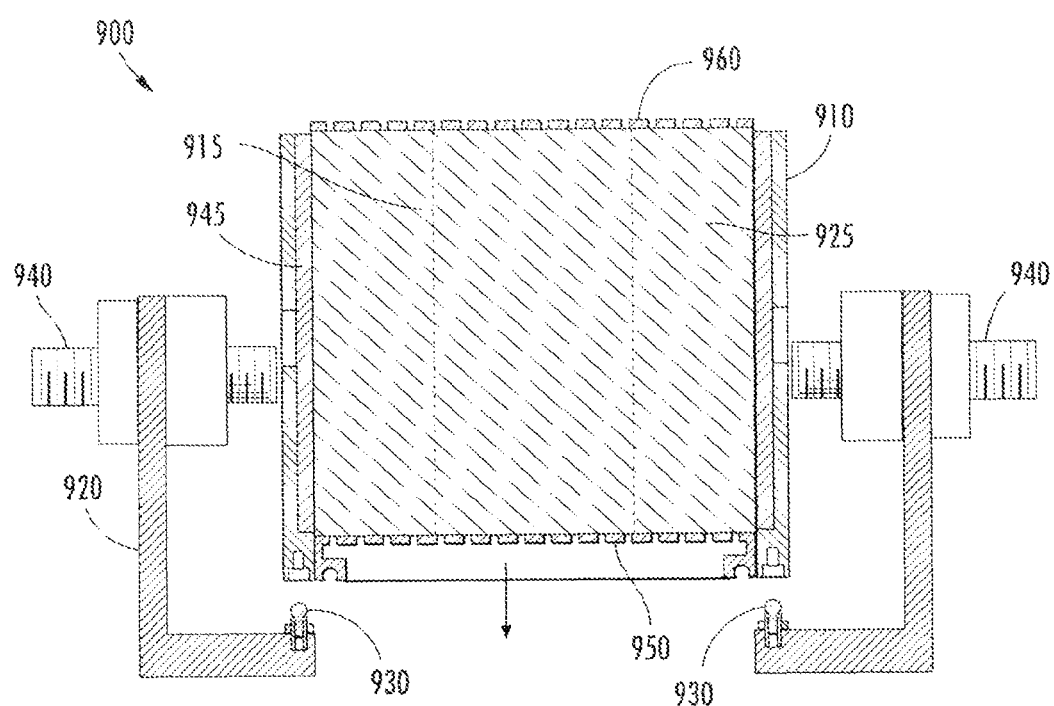
FIG. 11 is a front plan view of an alternate part cake enclosure being inserted into an enclosure housing.

All of the previous drawings and discussions refer to laser sintering systems of the type indicated in FIG. 2, that have removable and replaceable alignment apparatus for the part cake enclosure, nesting in a wheeled cart. Older systems that do not have removable and replaceable alignment apparatus for enclosures for the part cake can be easily modified so that the build chamber can be removed from their laser sintering system, and manually or automatically placed in the housing of a cooling station. This aspect of the invention is illustrated in FIG. 11, shown generally by the numeral 900. FIG. 11 illustrates insertion of a modified part cake chamber 910 from an older system into a housing 920 having locators 930 for precisely locating the part cake chamber 910 and displacement rods 940 for compressing the interior displaceable wall portions 945 of the part cake chamber 910 against a part cake 925 and build 915. The invention can be adapted for use with these older laser sintering devices by removing the completed build and part cake chamber from the laser sintering system and placing that part cake chamber within a housing having the displacement rods 940 and locators 930 as illustrated in FIG. 11. As can be seen in FIG. 11, part cake chamber 910, enclosing part cake 925 with a completed part build 915 (in shadow) has been modified to include movable internal displaceable wall portions 945, a perforated build platform 950 and a perforated lid 960, and locators 930 for precise location within a cooling housing.

Figure 12:
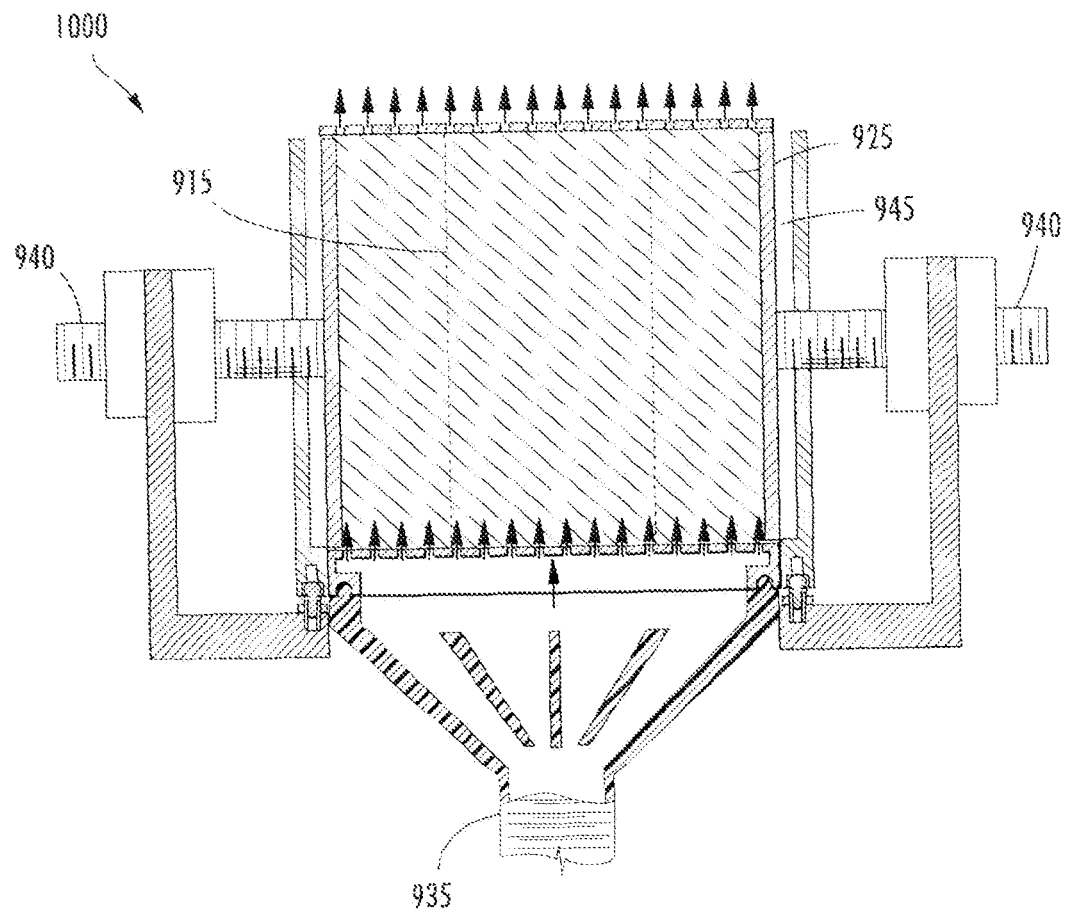
FIG. 12 is a view illustrating the alternate part cake enclosure in a compressed condition, with cooling fluid flowing through it.

Once the modified part cake chamber 910 is properly configured within housing 920, displacement rods 940 can be used to compress the part cake 925 into a part cake compression position while connected to a supply of forced cooling fluid. This is illustrated in FIG. 12 in which interior displaceable wall portions 945 have compressed part cake 925 and a supply of cooling fluid 935 has been applied to flow upward through part cake 925 to rapidly cool the rigidly supported part build 915 (in shadow).

Figure 13:
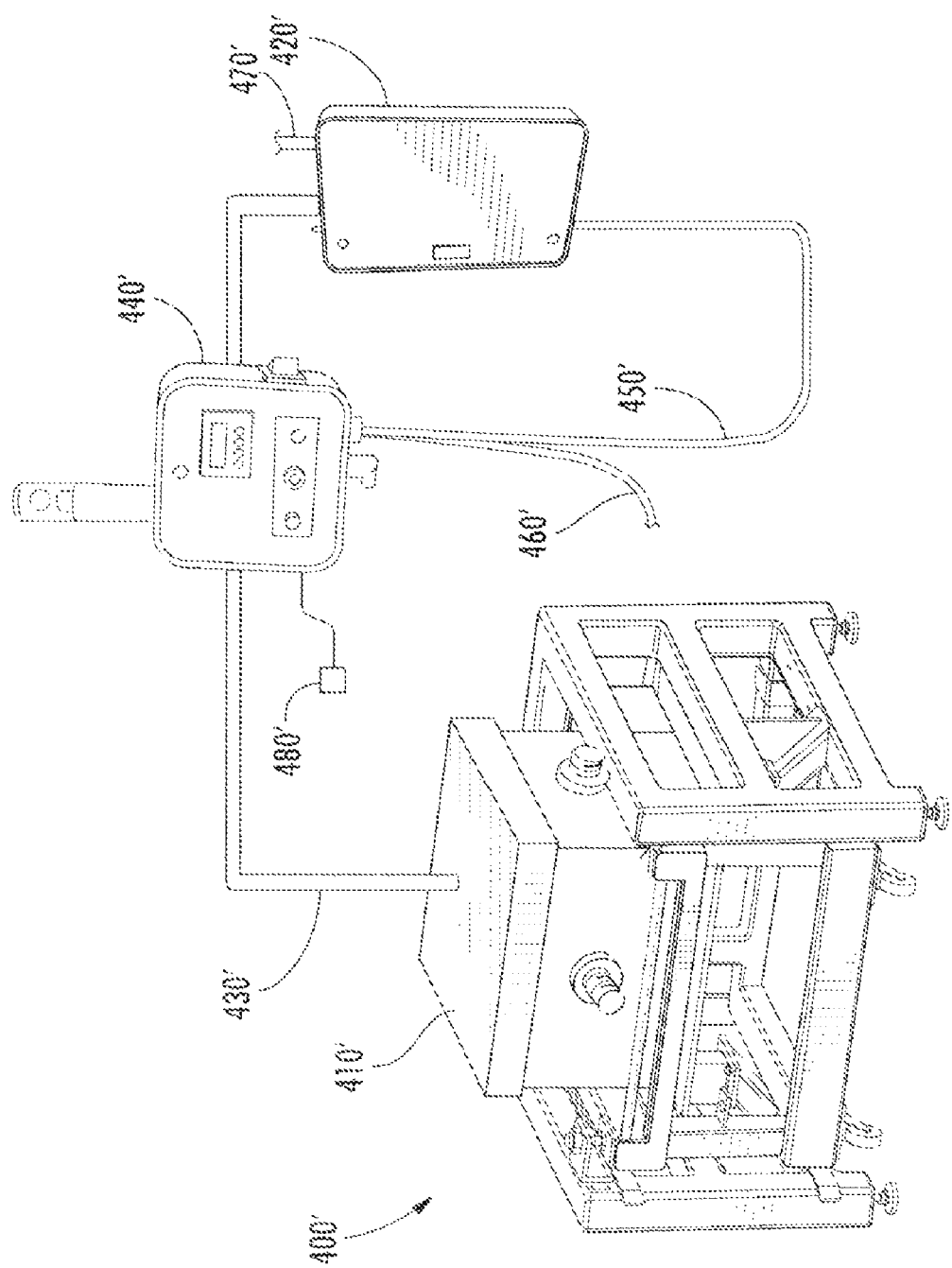
FIG. 13 is an exploded perspective view similar to FIG. 5, but illustrating the inert gas blanket apparatus of one embodiment of the present invention, wherein the controller and the inert gas supply are not shown to scale for illustrative purposes.

Turning now to FIG. 13 (not to scale), a further embodiment of the present invention is disclosed in which an inert gas blanket apparatus 400' is used to prevent oxidation of the portions of the part cake that would otherwise oxidize when exposed to atmospheric conditions. Such oxidation of the part cake typically occurs when the part cake is at temperatures above about a certain amount, such as 150° C. for certain polyamide materials to provide one non-limiting example, and the part cake is exposed to oxygen in the atmosphere (the temperatures and rate of oxidation depend upon the particular material of the part cake and/or the size of the part cake). The oxidation undesirably discolors the part cake (including the build) and may adversely affect the material properties of the unfused powder (which is typically reused) and/or the build. Accordingly, the insert gas blanket apparatus of the present invention allows the part cake to be safely removed from the laser sintering system without waiting for the part cake to cool to about 150° C. or less (which for some large part cakes can take 24 hours to cool down to about 150° C. when left in the laser sintering system and when no forced cooling fluid is provided as described above) and/or allows the part cake to be safely and/or quickly cooled while the part cake remains within the laser sintering system.

The inert gas blanket apparatus 400' comprises a lid 410' that selectively covers the part cake. For example, an operator may manually place the lid on the part cake, or automated equipment may be used to place the lid on the part cake. The lid 410' includes a passage that receives inert gas provided by an inert gas supply 420'. The inert gas supply 420' of the illustrated embodiment is a nitrogen generator; however, further embodiments include alternative supplies for any inert gas, with one non-limiting example being a pure supply of nitrogen gas. When the inert gas supply comprises nitrogen generator, the nitrogen is separated from the air in the surrounding atmosphere such that the total amounts of nitrogen, oxygen, carbon dioxide, and other gases in the room in which the laser sintering system and/or associated equipment are located is generally preserved despite the relative concentration of nitrogen proximate the inert gas blanket apparatus. When the inert gas supply comprises a pure supply of nitrogen gas, the total amounts of individual gases will change with the increasing relative amount of nitrogen provided by the pure supply of nitrogen gas.

The inert gas supply 420' of FIG. 13 provides the inert gas through a hose 430' to the passage in the lid 410' (such that the inert gas supply is in fluid communication with the passage of the lid), and after the inert gas passes through the passage, the inert gas is in fluid communication with the part cake, such that the inert gas forms a blanket that generally displaces oxygen or other non-inert gases that may otherwise come into contact with the part cake, thus reducing or eliminating oxidation of the part cake.

The inert gas blanket of the present invention also comprises a controller 440' that selective controls the flow of inert gas from the inert gas supply 420' to the lid 410'. The controller 440' of the exemplary embodiment of FIG. 13 is in electrical communication with the inert gas supply 420' via cable 450' and is powered by power cord 460'; however further embodiments of the present invention may have alternative communication between the controller and inert gas supply and/or alternative power supplies for the controller. The inert gas supply 420' of FIG. 13 is illustrated with a compressor line 470' connected to the inert gas supply in order to provide compressed air, such as from a standard compressor, to allow the inert gas supply to operate in a manner known in the art. Further embodiments of the present invention include alternative inert gas supplies that may operate with or without compressed air.

Referring again to FIG. 13, the controller 440' controls at least one valve device (not shown) in flow communication with hose 430' to selectively release inert gas to the lid at a certain time, for a certain duration, and/or at a certain rate. For example, in the illustrated embodiment, the operator places the lid on the part cake enclosure and activates the controller so that the inert gas flows to the passage of the lid. The controller 440' allows the operator to start and stop the flow of inert gas through hose 430', to set a timer so that the controller automatically stops the flow of inert gas after a certain period of time (such amount of time being sufficient for the part cake to cool a desired amount), and/or to set the flow rate of the inert gas to ensure that a sufficient blanket of inert gas is provided to reduce or eliminate oxidation of the part cake and/or to cool the part cake adequately. Controllers of further embodiments of the present invention include alternative and/ or additional functions and controls to provide the desired protection and/or cooling of the part cake.

Turning again to lid 410' of FIG. 13, the lid comprises a top portion generally parallel to a top surface of the part cake when the lid is covering the part cake, and the passage is provided in the top surface of the part cake. The lid 410' also comprises sidewalls overhanging the sides of the part cake such that when the inert gas is supplied to the passage, the inert gas generally flows over the top surface of the part cake and between the sides of the part cake and the sidewalls of the lid to generally define a blanket of inert gas over the top surface of the part cake. Additionally and/or alternatively, the inert gas may be provided through the passage and the lid may be configured such that the inert gas flows through the part cake and out one or more wall portions (such as the build platform to provide one non-limiting example) that define fluid passages to not only protect the part cake from oxidation but also cool the part as described above. Still further embodiments of the present invention include alternative inert gas blanket apparatus for protecting the part cake from oxidation and/or cooling of the part cake.

Because various embodiments of the present invention provide inert gas that may mix with the ambient air surrounding the apparatus while or after the part cake is being cooled and/or blanketed, operators must be careful when operating the apparatus in confined areas in which the amount of oxygen in the air may drop below the amount needed for the operator to breath safely. Therefore, certain embodiments of the present invention include an inert gas sensor and/or an oxygen sensor, such as the oxygen sensor 480' of FIG. 13, for monitoring the amount of inert gas supplied and/or the amount of oxygen in the surrounding environment (in which the operator would be present) to ensure that a sale level of oxygen is available for the operator to breath. If the sensor, in conjunction with a controller, determines that the amount of oxygen may be unsafe, the apparatus will alert the operator, via an audible and/or visual alarm, and/or will automatically shut off the flow of inert gas. Still further embodiments of the present invention include additional and/or alternative safety features that may be used with the present invention if the operator will be using the apparatus in an area in which the oxygen in the air may be replaced with the inert gas to an unsafe level.

In the drawings and specification, there have been disclosed typical embodiments of the invention, and, although specific terms have been employed, they have been used in a generic and descriptive sense only and not for purposes of limitation, the scope of the invention being set forth in the following claims. Furthermore, it should be appreciated that the different elements of the various embodiments disclosed herein may be combined in manners not explicitly disclosed herein.

What is claimed is:

1. A method for producing a build by laser sintering, the method comprising:
   a) producing a build in a part cake contained in an enclosure for containing the part cake, the enclosure having a first pair of opposed displaceable wall portions in displaceable relation from a laser sintering position to a part cake compression position, wherein the first pair of opposed displaceable wall portions are sides of the enclosure and the enclosure also having at least one wall portion having fluid passages therethrough;
   b) removing the enclosure containing the part cake from the laser sintering system;
   c) displacing at least one of the displaceable wall portions from a laser sintering position to a part cake compression position, thereby compressing the part cake to support the build to generally prevent distortion of the build during cooling;
   d) forcing a cooling fluid through the at least one wall portion having fluid passages therethrough and further through the part cake while the part cake is under compression; and
   e) removing the build from the part cake.

2. The method of claim 1 further comprising decompressing the part cake after the part cake has been cooled, prior to removing the build from the part cake.

3. The method of claim 1 wherein forcing a cooling fluid through the compressed part cake comprises attaching a source of forced cooling fluid to a housing that encloses the part cake.

4. The method of claim 1 wherein the part cake is compressed to between 60% and 80% of full density.

5. The method of claim 1 wherein the at least one wall portion having fluid passages therethrough comprises a build platform.

6. The method of claim 1 wherein the at least one wall portion having fluid passages therethrough comprises a perforated lid.

7. The method of claim 1 wherein forcing a cooling fluid through the at least one wall portion having fluid passages therethrough comprises forcing inert gas through the at least one wall portion having fluid passages therethrough.

8. The method of claim 1 wherein forcing a cooling fluid through the at least one wall portion having fluid passages therethrough comprises forcing air through the at least one wall portion having fluid passages therethrough.

9. The method of claim 1 wherein the enclosure having a second pair of opposed displaceable wall portions in displaceable relation from a laser sintering position to a part cake compression position.

10. The method of claim 1 wherein the at least one wall portion having fluid passages therethrough comprises a wall portion of the first pair of opposed displaceable wall portions.

11. The method of claim 1 wherein the first pair of opposed displaceable wall portions of the enclosure form the sides of the enclosure.

12. The method of claim 11 wherein the at least one wall portion having fluid passages therethrough comprises a wall portion of the first pair of opposed displaceable wall portions.

* * * * *